United States Patent [19]
Potthoff et al.

[11] Patent Number: 5,525,271
[45] Date of Patent: Jun. 11, 1996

[54] LIQUID-VAPOR CONTACT DEVICE

[75] Inventors: Richard W. Potthoff; Alan C. Burton, both of Scotch Plains, N.J.

[73] Assignee: The BOC Group, Inc., New Providence, N.J.

[21] Appl. No.: 330,289

[22] Filed: Oct. 27, 1994

[51] Int. Cl.$^6$ ........................................ B01F 3/04
[52] U.S. Cl. ........................... 261/110; 261/114.3
[58] Field of Search ........................ 261/114.3, 110

[56] References Cited

U.S. PATENT DOCUMENTS

| | | | |
|---|---|---|---|
| 2,339,561 | 1/1944 | Durrum | 261/114.1 |
| 2,515,090 | 7/1950 | Linder | 261/110 |
| 2,591,343 | 4/1952 | Eld | 261/113 |
| 3,172,922 | 3/1965 | Kehse | 261/20 |
| 3,434,701 | 3/1969 | Bauer | 261/114.1 |
| 3,550,916 | 12/1970 | Hoppe et al. | 261/114.3 |
| 3,589,689 | 6/1971 | English | 261/114.3 |
| 3,669,425 | 6/1972 | Copeland | 261/110 |
| 3,887,665 | 6/1975 | Mix et al. | 261/114.1 |
| 4,105,723 | 8/1978 | Mix et al. | 261/105 |
| 4,269,796 | 5/1981 | Glicksman et al. | 261/112.2 |
| 4,318,870 | 3/1982 | Haselden | 261/114.3 |
| 4,556,522 | 12/1985 | Wilson | 261/114.1 |
| 4,738,807 | 4/1988 | Aitken et al. | 261/114.1 |
| 4,921,641 | 5/1990 | Lavin | 261/112.2 |
| 5,091,119 | 2/1992 | Biddulph et al. | 261/114.3 |

FOREIGN PATENT DOCUMENTS 765623   1/1957   United Kingdom .

Primary Examiner—Tim R. Miles
Attorney, Agent, or Firm—David M. Rosenblum; Larry R. Cassett

[57] ABSTRACT

A liquid-vapor contact device having a plate-like body provided with a central section formed of expanded metal construction. The expanded metal construction provides slit-like openings for the vapor to ascend through the plate-like body and mix with liquid traversing the plate-like body. Tongue-like flow deflectors associated with the openings impart momentum to the vapor in a flow direction taken from inlet and outlet segments of the plate-like body. A plurality of elongated members overlie the central segment of the plate-like body. The plurality of the elongated members define channels running from the inlet and outlet segments which are preferably outwardly curved to ensure complete liquid distribution across the plate-like body. In addition, flow impedance members in the form of cut and bent tabs impede the flow of liquid across the plate-like body while flinging liquid against side surfaces of the elongated members to produce a falling film and therefore a secondary mechanism for liquid-vapor contact.

6 Claims, 3 Drawing Sheets

LIQUID-VAPOR CONTACT DEVICE

BACKGROUND OF THE INVENTION

The present invention relates to a liquid-vapor contact device for contacting liquid and vapor phases of a mixture in, for example, a distillation column. More particularly, the present invention relates to such a liquid-vapor contact device including a perforate plate-like body for effecting the contact between the liquid and vapor phases. Even more particularly the present invention relates to such a liquid-vapor contact device having flow deflectors for imparting momentum to the vapor phase and thereby the liquid phase and flow impedance members for impeding the flow of the liquid phase. Still even more particularly the present invention relates to such a device in which the flow impedance members are formed on a plurality of elongated members overlying the plate-like body and in which the elongated members provide side surfaces for liquid film to form from the liquid phase of the mixture.

In the chemical arts, multi-component mixtures are rectified in distillation columns having liquid-vapor contact devices to contact ascending vapor and descending liquid phases of the multi-component mixture. Through such contact, the descending liquid phase becomes ever more concentrated in the heavier components of the mixture to be separated while the ascending vapor phase becomes every more concentrated in the lighter components of the mixture.

Common liquid-vapor contact devices are known as bubble cap plates and sieve trays. In both types of devices the vapor phase ascends through openings provided in the trays or plates to contact liquid of the liquid phase traversing the trays or plates. The liquid phase is supplied to and is discharged from inlet and outlet sections of the plates or trays by downcomers provided in the column. In such manner, the vapor bubbles up through the liquid and mixes with the liquid to effect a change in the composition of the liquid and the vapor. Thereafter, the liquid is discharged from a particular plate or tray and the vapor ascends from the liquid to the next succeeding plate or tray.

Another type of liquid-vapor contact element is a packing. In a packing, the liquid phase of the mixture descends as a film formed on the packing elements while the vapor rises through interstices between packing elements. A common packing element is structured packing in which vertically oriented sheets are provided with crimps which criss-cross each other as between sheets. Structured packings have found widespread use in the petrochemical and air separation industry due to their low pressure drop characteristics which can be translated into power savings and increased separations of mixtures which are by nature are difficult to separate. The disadvantage of structured packing has been one of cost when compared to trays or plates.

In order to improve the performance of a tray-like element, a liquid-vapor contact device has been proposed in U.S. Pat. No. 5,091,119 (hereby incorporated by reference as if fully set forth herein). This liquid vapor contact element of this patent has a tray formed of expanded metal. The tray is provided with slit like openings and tongue-like elements associated with the openings to propel ascending vapor in a direction taken from an inlet to an outlet section of the tray. In order to increase the residence time of the liquid, an overlying expanded metal grid work is provided to inhibit the flow of the liquid from the inlet to the outlet.

As will be discussed, the present invention provides an improved liquid-vapor contact element in the form of a tray that incorporates features of U.S. Pat. No. 5,091,119, with features of structured packing by providing surfaces on which descending liquid films can be formed to enhance the area of liquid-vapor contact.

SUMMARY OF THE INVENTION

The present invention provides a liquid-vapor contact device. The device comprises a plate-like body having an inlet segment for receiving the liquid and an opposed outlet segment for discharging the liquid. A central segment is provided connecting the inlet and outlet segments, on which the liquid flows across the plate-like body from the inlet segment to the outlet segment. The central segment is provided with openings for the vapor to ascend through the tray-like body. A plurality of flow deflectors are associated with the openings for imparting momentum to the vapor and therefor the liquid in a flow direction taken from the inlet segment to the outlet segment. A plurality of elongated members overlying the central segment are provided. The elongated members have side surfaces oriented in a normal direction with respect to the plate-like body. Additionally, the elongated members define channels running from the inlet to the outlet segments and have flow impedance members projecting from the side surfaces thereof so as to retard the flow of the liquid and direct the liquid to the side surfaces, thereby to form a descending film of the liquid on the side surfaces for mixing with the vapor.

As is evident, ascending vapor imparts a momentum to the liquid from the inlet to the outlet. However, the flow of the liquid is retarded through the flow deflectors to increase liquid-vapor contact. At the same time, the impedance members deflect the liquid to the side surfaces of the elongated members to provide falling-film mechanism for liquid-vapor contact. Thus, increased performance of a plate-like liquid-vapor contact device is produced by the subject invention by providing more interfacial area for contact of the liquid and vapor.

BRIEF DESCRIPTION OF THE DRAWINGS

Although the specification concludes with claims distinctly pointing out the subject matter that Applicants' regard as their invention, it is believed that the invention will be better understood when taken in connection with the accompanying drawings in which:

DETAILED DESCRIPTION

Figure 1:
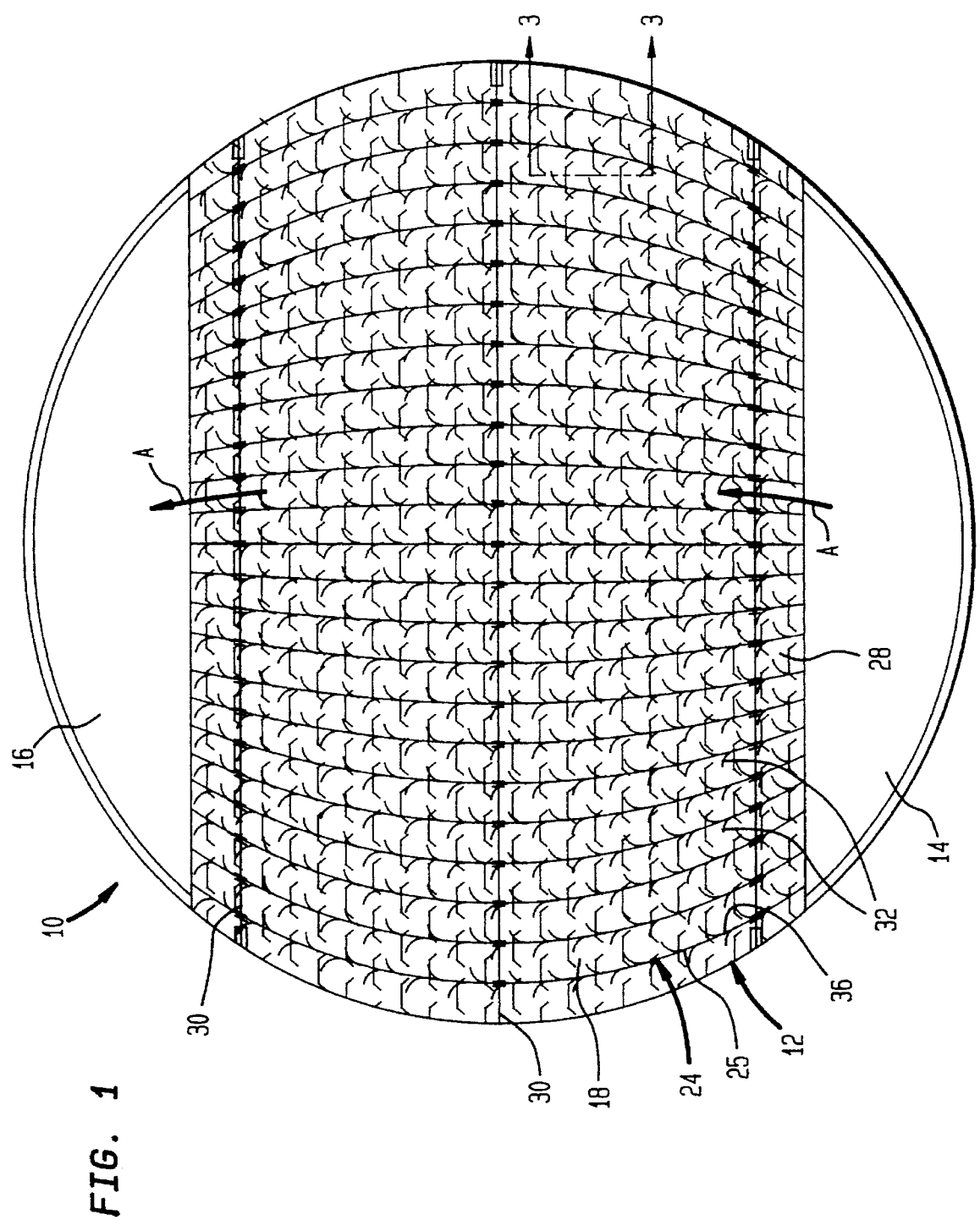
FIG. 1 is a top plan view of a liquid-vapor contact device in accordance with the present invention with portions broken away to show a central segment of the device formed from expanded metal.

With reference to FIG. 1 a liquid-vapor contact device 10 in accordance with the present invention is illustrated. Liquid-vapor contact device 10 is formed by a plate-like body 12 having an inlet segment 14 for receiving liquid and an opposed outlet segment 16 for discharging the liquid. A central segment 18 connects the inlet and outlet segments 14 and 16. The liquid flows across central segment 18 of plate-like body 12 in a direction indicated by arrowhead A from inlet segment 14 to outlet segment 16.

Figure 2:
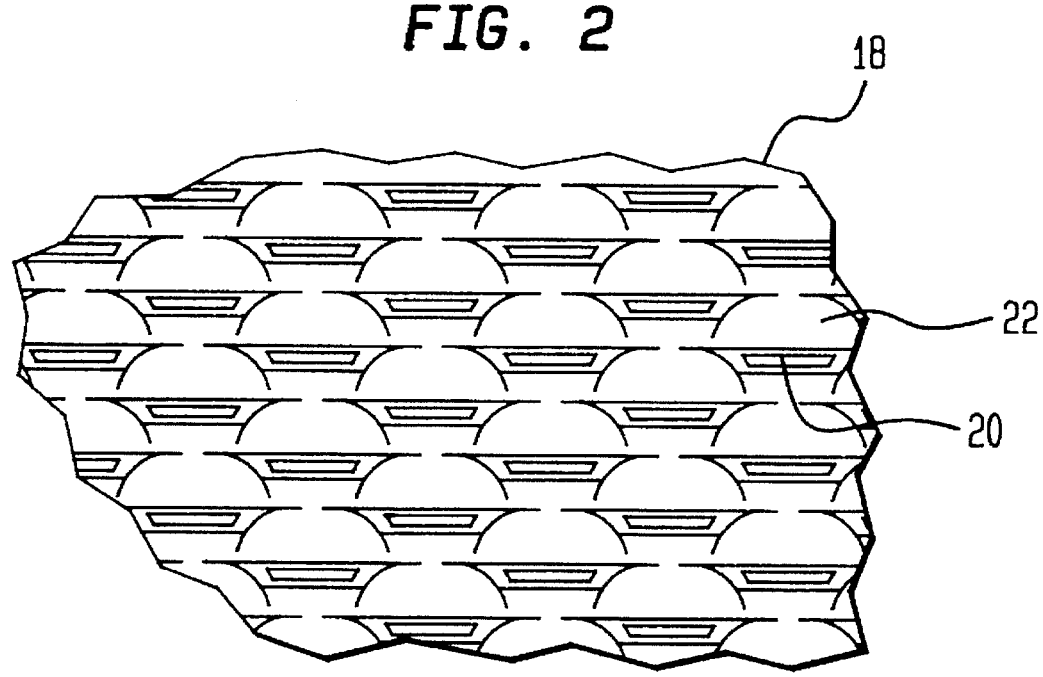
FIG. 2 is fragmentary, top plan view of a central segment of FIG. 1.

With additional reference to FIG. 2, vapor ascends through openings defined in central section 18 of plate-like body 12 that are produced by an expanded metal sheet formation having slits 20 to form the openings and a plurality of flow deflectors 22 associated with slits 20 for imparting momentum to the vapor and therefore the liquid in the flow direction indicated by arrowheads A. The flow deflectors have a tongue-like configuration.

Figure 3:
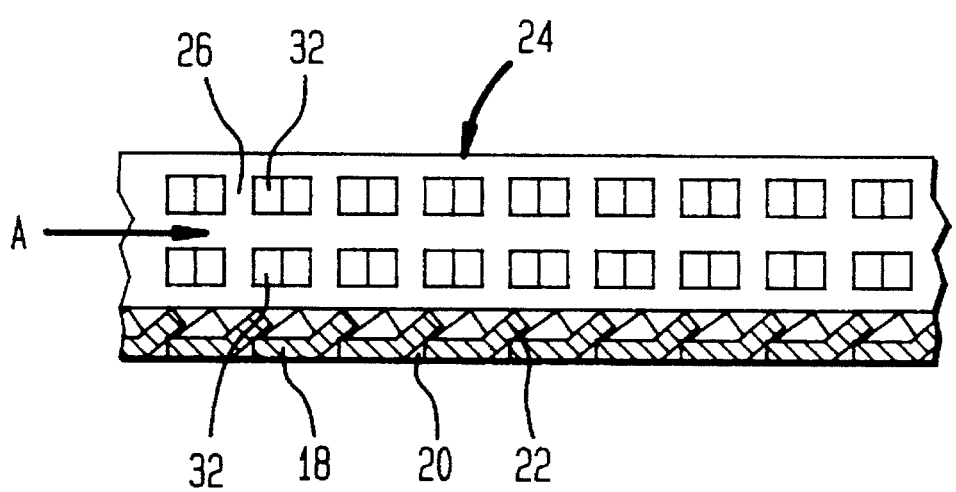
FIG. 3 is an elevational, cross-sectional view of FIG. 1 taken along lines 3—3 thereof.
Figure 4:
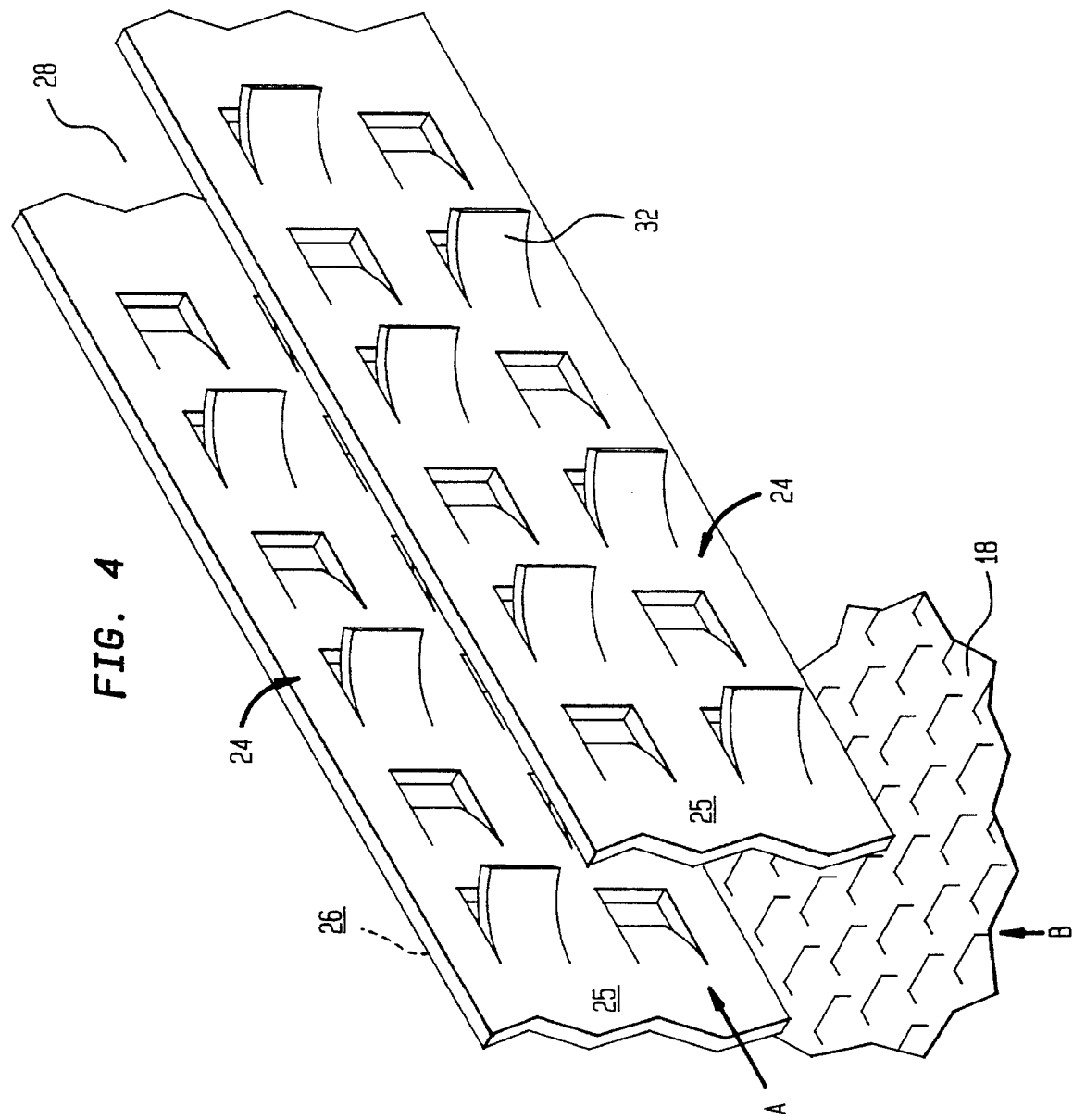
FIG. 4 is a fragmentary respective view of FIG. 1.

With reference to FIGS. 3 and 4, a plurality of elongated members 24 overly central segment 18 and have side surfaces 25 and 26 which are oriented in a normal direction with respect to plate-like body 18. It will be understood that the term "normal direction" as used herein and in the claims does not necessarily mean that the side surfaces are at right angles with respect to the plane of the plate-like body 12. Side surfaces 25 and 26 could have a convexity, a concavity, or be oriented at an angle with respect to the plate of plate-like body 18. For instance, elongated members 24, illustrated herein, are rectangular sheets. However, they could have a more solid form and thus be of trapezoidal cross-section to impart the angle to side surfaces 25 and 26.

Elongated members 24 form channels 28 running from inlet to outlet segments 14 and 16 and preferably are outwardly curved to ensure a wide and complete distribution of liquid on central section 18 of plate-like body 12. Elongated members 24 are held in their outwardly curved or bowed shape and in position by tie rods 30. As can be appreciated, although not preferred, elongated members 24 could run directly from inlet segment 14 to outlet segment 16 without any curvature.

A plurality of flow impedance members 32, preferably integrally formed with elongated members 24 are provided. Preferably flow impedance members 32 are rectangular tabs cut out of elongated members 24 and bent to project from side surfaces 25 and 26. Preferably, flow impedance members 32 are arranged in two rows with the flow impedance members 32 bent in alternate, opposite directions in each row.

As can be appreciated, vapor ascending through central section 18 of plate-like body 12 (in the direction of arrowhead B) imparts momentum to liquid in direction of arrowhead A. This momentum may have a sufficient magnitude that the liquid flow rate across central section 18 is such as not to provide enough residence time for a liquid-vapor mixing to fully take place. Flow impedance members 32 retard the motion of the liquid for this purpose. In addition, flow impedance members 32 also cause liquid to be flung against opposed side surfaces 25 and 26 so that a descending film can be produced to increase liquid-vapor contact.

A typical embodiment of the subject invention, elongated members 24 are set apart anywhere from between about, 0.64 centimeters to about 10.16 centimeters. Each of the elongated members 24 have a height that was calculated to be within a range of about 3.81 centimeters and about 0.54 centimeters below the next plate-like member 12, located directly above. Preferably, elongated members 24 should have about the same height as the liquid-gas dispersion.

Although the invention has been described with reference to a preferred embodiment, it will be understood by those skilled in the art that numerous changes, omissions and additions can be made without departing from the spirit and scope of the present invention.

We claim:

1. A liquid-vapor contact device comprising:

a plate-like body having an inlet segment for receiving said liquid, an opposed outlet segment for discharging said liquid, and a central segment connecting said inlet and outlet segments and on which said liquid flows across said plate-like body from said inlet segment to said outlet segment;

said central segment having openings for said vapor to ascend through said plate-like body;

a plurality of flow deflectors associated with each of said openings for imparting momentum to said vapor and therefore said liquid in a flow direction taken from said inlet segment to said outlet segment; and a plurality of elongated members overlying said central segment and having side surfaces oriented in a normal direction with respect to said plate-like body;

said plurality of elongated members defining channels running from said inlet to said outlet segments and having flow impedance members projecting from said side surfaces thereof so as to retard the flow of said liquid and to direct said liquid to said side surfaces, thereby to form a descending film of said liquid on said side surfaces for mixing with said vapor.

2. The liquid-vapor contact device of claim 1, wherein said elongated members comprise a plurality of rectangular sheets extending from said inlet to said outlet segments and having an outwardly curved configuration to distribute said liquid throughout said central segment of said sheet.

3. The liquid-vapor contact device of claim 1, wherein said plate-like body, openings and said plurality of flow deflectors comprise an expanded metal sheet formation having slits forming said openings and tongues associated with said slits forming said flow deflectors.

4. The liquid-vapor contact device of claim 3, wherein said elongated members comprise a plurality of rectangular sheets extending from said inlet to said outlet segments and having an outwardly curved configuration to distribute said liquid throughout said central segment of said sheet.

5. The liquid-vapor contact device of claim 4, wherein said flow impedance members comprise a plurality of rectangular tabs cut out of said rectangular sheets and bent to project from said side surfaces thereof.

6. The liquid-vapor contact device of claim 5, wherein said rectangular tabs on each of said sheets are arranged in two rows extending in a lengthwise direction thereof and alternately bent in opposite directions.

\* \* \* \* \*